Figure 1:
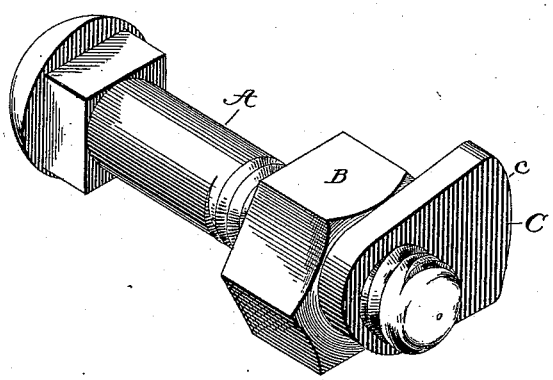

(Model.)

L. H. YOUNG.
LOCK NUT.

No. 447,224. Patented Feb. 24, 1891.

Witnesses:
W. W. Mortimer
W. R. Kennedy

Inventor:
Levi H. Young
By Phil T. Dodge

THE NORRIS PETERS CO., PHOTO-LITHO., WASHINGTON, D. C.

UNITED STATES PATENT OFFICE.

LEVI H. YOUNG, OF ST. JOHN, CANADA.

LOCK-NUT.

SPECIFICATION forming part of Letters Patent No. 447,224, dated February 24, 1891.

Application filed December 2, 1890. Serial No. 373,341. (Model.) Patented in Canada July 12, 1890, No. 34,694.

*To all whom it may concern:*

Be it known that I, LEVI H. YOUNG, of St. John, in the Province of New Brunswick, Canada, have invented certain Improvements in Lock-Nuts, (for which I have obtained Letters Patent in Canada, dated July 12, 1890, No. 34,694,) of which the following is a specification.

The aim of my invention is to provide a nut-locking device which may be applied to the end of the bolt outside of the nut without removing the latter, and which will in every case lock and sustain the nut in any position in which it may chance to stand at the time the lock is applied. To this end I provide a lock-nut threaded to screw upon the bolt and elongated or weighted on one side, so that it tends constantly to gravitate to and remain in one position. When this lock-nut is screwed home to its place on a right-hand thread against the main nut, its heavy end must stand on the right of the center in order that it may have a tendency to screw farther onto the bolt and thus keep the bearing against the nut. Now in practice, and particularly on railroads where my device is mainly used, it frequently happens that the main nut stands in such position that when the lock-nut is screwed home the heavy side will fall on the wrong—that is to say, the left—side of the center. Provision must, therefore, be made to prevent this occurrence and enable the lock to hold the nut in any and every position in which it may be found. This I accomplish by making the lock-nut of such thickness that its thread terminates at its opposite faces on the same side of the center. When the lock-nut is thus formed, its heavy edge will fall on the right or the left of the center, according as one or the other of its faces is placed toward the main nut. If it be found on screwing the lock-nut home that its heavy edge falls on the wrong side of the center, it is only necessary to remove it from the bolt and screw it on the other side first, when it will be certain to assume the desired position with the heavy edge on the right. In practice this renewal and reversal is never necessary. The two faces of the lock-nut are marked or varied so that they may be readily distinguished. The mechanic quickly learns that when a full thread is exposed to view by the main nut on the upper side of the bolt the lock-nut must be applied with a certain side inward, and that if the main nut exposes only a partial thread at the top the other side of the check-nut must be presented inward. In practice it is found that the lock-nut may be thus applied correctly in the first instance without fail.

Figure 2:
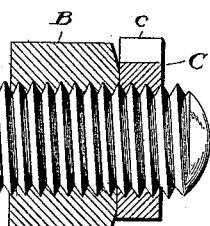
Figure 3:
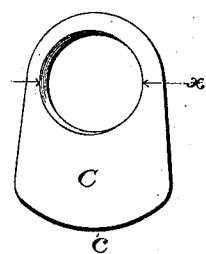
Figure 4:
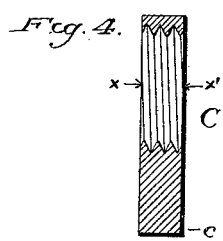
Figure 5:
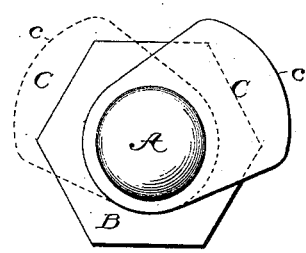

In the accompanying drawings, Figure 1 is a perspective view of a bolt and nut provided with my locking device. Fig. 2 is a longitudinal central section through the same. Fig. 3 is a face view of the lock-nut. Fig. 4 is a cross-section through the same. Fig. 5 is a diagram illustrating the action of the lock.

Referring to the drawings, A represents an ordinary bolt provided with an external thread at one end, B an ordinary nut designated herein for clearness the "main nut," and C the lock-nut screwed upon the bolt outside of and against the main nut for the double purpose of locking the same and of giving it support and partial relief from strain.

The lock-nut is extended or prolonged on one side of the center, as shown at c, so that when in place this edge preponderating in weight tends to gravitate to the under side of the bolt, and in so doing to turn the lock-nut to the right or left, according to which side of the center the heavy side chances to lie.

On one face of the lock-nut the thread terminates or emerges at x, while on the opposite face it terminates at x' on the same side of the center. In consequence of this fact the lock-nut with one face against the main nut will present its heavy edge on the right, as shown in full lines in Fig. 5. With its other face against the main nut, the latter remaining in its first position, the lock-nut will present the heavy edge on the left, as shown in dotted lines in Fig. 5.

The marginal form of the lock-nut may be varied at will, provided only one edge is given an extra weight.

The two faces of the lock-nut are flat, or substantially so, in order that it may be turned up firmly and directly against the outer face of the main nut, which is not only prevented from backing off, but also given a solid support on the outside, so that the main nut may be thinner and cheaper than would otherwise be necessary.

My locking device has been found particularly advantageous in connection with railroad-joints. These joints are made throughout the United States with splicing-plates of L form in cross-section and with bolts and nuts of standard size. My device may be applied to all these existing joints in a moment and without removing the nuts or bolts or changing the latter from their proper positions. It acts to hold the parts in place, avoids all the expense incident to the frequent inspection and tightening of the nuts now in use, and gives to the joint greatly-increased strength. In railroad practice the main nuts and the inner threads of the bolts are frequently worn and cut away, so that the nuts become loose and the joint weakened. In such case it is the custom to renew the bolt and nut, and at the present day vast amounts are expended by railroad companies in this connection. My device applied to the outer unworn end of the bolt gives to the joint its original strength and avoids the necessity of using either a new bolt or nut.

For clearness and convenience of description I have defined my nut as having its thread terminated on opposite sides of the center. By this is meant that its thickness is such that the threads continued to the faces would thus terminate, and it is to be understood that my invention would not be avoided by simply cutting away the threads at their ends, so as to terminate them on the same side of the center.

I do not claim herein, broadly, the combination of a bolt, a nut, and a lock-nut weighted on one edge, nor do I caim herein the combination of two weighted nuts on a bolt to lock a main nut, as those matters are foreign to the scope of the present invention.

Having thus described my invention, what I claim is—

A reversible lock-nut having flat or substantially flat faces and a preponderance of weight at one edge, and of such thickness in relation to its thread that when screwed up to a given point on a bolt the heavy edge will fall on one side or the other of the center, according as one or the other of its faces is outermost, whereby it is adapted to securely lock a nut at any desired point on a bolt.

In testimony whereof I hereunto set my hand, this 28th day of November, 1890, in the presence of two attesting witnesses.

LEVI H. YOUNG.

Witnesses:
W. R. KENNEDY,
FABIUS STANLY ELMORE.